United States Patent [19]

Lange et al.

[11] 3,729,829
[45] May 1, 1973

[54] DOUBLE CANTILEVER SPLIT-PIN DISPLACEMENT GAGE

[75] Inventors: Eugene A. Lange, Washington, D.C.; Renald F. Bryner, Oxon Hill, Md.

[73] Assignee: The United States of America as represented by the Secretary of the Navy

[22] Filed: Oct. 22, 1971

[21] Appl. No.: 191,697

[52] U.S. Cl. ..................... 33/148 D, 33/DIG. 13
[51] Int. Cl. ................................................. G01b 7/16
[58] Field of Search ................. 33/DIG. 13, 148 D, 33/147, 178 E; 73/88.5; 338/2, 6

[56] References Cited

UNITED STATES PATENTS

| | | |
|---|---|---|
| 2,712,645 | 7/1955 | Keene .......................... 73/88.5 R |
| 2,815,424 | 12/1957 | Painter ........................ 33/148 H X |
| 3,514,864 | 6/1970 | Davidson et al. ............... 73/88.5 |
| 3,534,479 | 10/1970 | Paine ........................... 33/148 D X |
| 3,007,252 | 11/1961 | Munn ........................... 33/DIG. 13 |
| 2,666,262 | 1/1954 | Ruge ............................ 33/148 H |
| 2,423,867 | 7/1947 | Zener et al. ................... 73/88.5 |

*Primary Examiner*—Harry N. Haroian
*Attorney*—R. S. Sciascia et al.

[57] ABSTRACT

This disclosure is directed to a double cantilever split-pin displacement gage for measuring small displacements such as the opening of a crack in a test specimen. The device is provided with two legs of a particular shape to which strain gages and a half section of a split-pin have been secured. The split-pin halves are formed with cylindrical end probes which are inserted into a hole drilled into a test specimen and as the test specimen separates the strain gages will produce an appropriate electrical signal to indicate the displacement of the separation due to movement of the split-pins in the hole.

3 Claims, 6 Drawing Figures

Patented May 1, 1973 3,729,829

INVENTORS
EUGENE A. LANGE
RONALD F. BRYNER JR.

BY *[signature]* AGENT

*[signature]* ATTORNEY

DOUBLE CANTILEVER SPLIT-PIN DISPLACEMENT GAGE

BACKGROUND OF THE INVENTION

This invention is directed to a device for measuring displacements in fracture mechanics tests and more particularly to a simple device for measuring the displacement in a test sample to determine the plane strain fracture toughness of the test material.

Heretofore various devices and systems have been used for indicating stress-strain in a material. One such device for measuring stresses in the interior of a material is set forth in U.S. Pat. No. 3,071,963. Conventional displacement gages used to conduct fracture mechanics tests have sensing arms that contact two knife edges which are either machined or mechanically fastened on each side of the notch in a specimen. One conventional gage is called a "clip-in gage," and the most commonly used gage is given the ASTM tentative method of test for Plane-Strain Fracture Toughness of Metallic Materials, ASTM STANDARD E399–70T Part 31 July 1970 PP 913, 920, 925, 926 and 927. The limitations of this gage are primarily mechanical, but these limitations have a great effect on ease of use and the cost of specimen preparation. The most limiting aspect results from a design featuring contact surfaces shaped like a knife edge which in principle provide parallel "line" contacts. It is difficult to use in a practical way since very precise machining and locating of the contact surfaces are required to obtain full contact of all mating surfaces. The mating grooves on the clip-on gage are Vee shaped, and they must be exactly parallel to preclude twisting of the sensing arms of the gage and errors in displacement measurement. Additionally, the sensing arms of most gages are beams of uniform cross-section, and this design results in a stiff spring action when the arms are made thick to provide a relatively high strain level where the electrical strain gages are located. A stiff spring action results in a high load on the knife-edges which can cause gage damage, and it can also upset the knife-edges causing errors in the electrical output of the gage. These limitations are minimized in the split-pin displacement gage of this invention.

STATEMENT OF THE OBJECTS

It is therefore an object of this invention to provide a displacement gage which is simple, accurate, efficient, is easy to operate and requires no particular alignment.

Another object is to provide a displacement gage for conducting fracture mechanics test which requires very little preparation of the test material.

Still another object is to provide a displacement gage which is very sensitive for measuring very small changes in displacement.

Yet another object is to provide a displacement gage which does not require the operation of an expert in the field.

Other objects and advantages will become apparent from a careful consideration of the following specification considered with the drawings.

DESCRIPTION OF THE DEVICE

Figure 1:
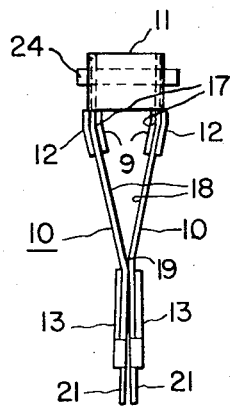
FIG. 1 illustrates an assembled device.
Figure 5:
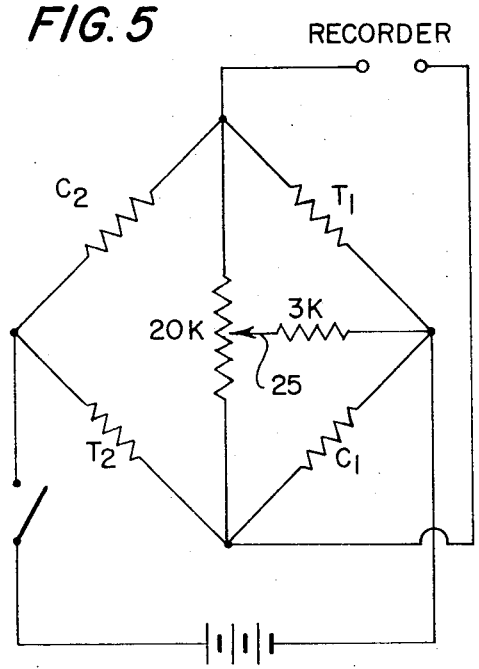
FIG. 5 illustrates an electrical circuit for carrying out the measurement of displacements measured by the device.

Now referring to the drawing, there is shown by illustration in FIG. 1 a completely assembled device made in accordance with the teaching of this invention. The device includes two beryllium-copper plates 10 of a particular shape which are assembled together at one end by use of a spacer block 11. Each of the plates are provided with strain gages 9 and 12 each secured on opposite sides thereof near the secured ends and a probe 13 secured to the lower end. The strain gages are connected to a Wheatstone Bridge circuit as shown in FIG. 5 such that the strain gages are additive and the voltage measuring instrument or recorder indicated therein is calibrated for displacement distance in accordance with the electrical resistance change of the strain gages due to flexing of the strain gages as the probes are moved. The electrical circuit is a modified Wheatstone Bridge in which the voltage drop due to the change of resistance in the strain gages is measured in millivolts. The dimensions given hereinafter for the gage elements provides a nominal gage factor which is 16.3 MV/V/in.

Figure 2:
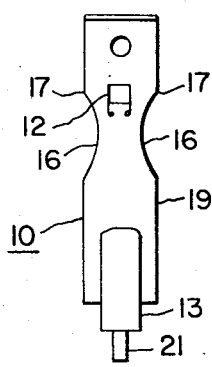
FIG. 2 illustrates an end view of one of the legs of the device.
Figure 4A:
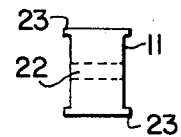
FIGS. 4a and 4b illustrate different views of a spacer block that separates the legs when assembled.
Figure 4B:
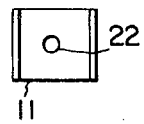
Figure 3:
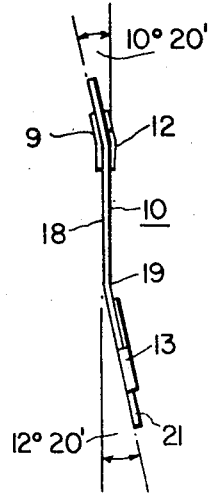
FIG. 3 illustrates a side view showing the shape of the legs of the device including strain gage thereon.

Each beryllium-copper plate as shown has a thickness of one thirty-second inch, 2 inches in length, and one-half inch in width. The plates as seen in FIG. 2 have cut-outs 16 on each side, each cut-out having a ½ inch radius such that the width of the plate at the narrowest point between the two cut-outs is 0.312 inches. The distance from the upper end of each plate to the upper edge of the cut-out is 0.5 inches. The upper end of each plate is bent at 17 at an angle of 10°20′ as shown in FIG. 3 with the center section 18. The bend is made at the upper edge of the cut-out and has a radius of 1½ inches. The lower end of each plate is bent at 19 in the opposite direction from the upper end at an angle of 12°20′ with the bend having a 1½ inch radius. The strain gages 9 and 12 are secured to each plate so that the strain gage centers adjacent to the bend 17 such that the strain gages are flexed, one in tension and one in compression, as each plate bends. The centerline of the gage is 0.562 in. from the upper end of each plate. The probe 13 attached to the lower end of each plate is formed by a half section of a split ¼ inch rod. The lower end of the ¼ inch rod is ground down to a ⅛ inch diameter cylinder having a length of nine-sixteenths inch. The rod is then cut into two half portions along its axis wherein the cutter slot measures one-sixteenth inch in width. Since the small end has been ground down to a ⅛ inch diameter and a 1/16 inch slot is cut through the rod, the lower ends of each half forms a semirounded probe 21 of one thirty-second inch in thickness with a length of nine-sixteenths inch. The inside surface of the probe end is an extension of the flat surface of the upper portion of the split rod. The flat side portion of the rod is cut away from the upper end down to within fifteen sixty-fourths inch of the upper end of the small end 21 for a depth equal to the thickness of the plate and then secured to the plate.

Therefore, the back surface of the plate aligns with the back portion of the probe end. The side of the probe that contacts the test material is rounded so that there is only a small surface contact which requires no aligning.

The spacer block 11 having 9/16 inch height and a thickness of three-eights inch is provided with a passage 22 through the center thereof and extended edges 23 on two edges. The extended edges are for a distance equal to the thickness of the plate and overlap the plates when assembled. The block is positioned between the upper ends of the plates and secured therebetween by a bolt 24 to form the assembled device of this invention. As shown in FIG. 1, the plates are secured with the body of the probes facing outwardly such that the lower ends are adjacent to each other with a spacing therebetween and substantially parallel. When forced together the plates will touch each other over the length of the bottom portion.

All machining, soldering, etc. are performed, then the fabricated plates are heat treated to ensure that the beryllium-copper material is hardened and that residual stress patterns will not interfere with calibration or operation. The strain gages 9 and 12 are secured in the electrical circuit such that any movement of the probes will be detected. One such electrical circuit is a modified Wheatstone bridge as shown in FIG. 5. Since the strain gages are attached to each arm of the device they will be additive as shown in each arm of the bridge network. Any change in the position of the arms of the device will induce a strain on one gage and compression on the other which will change the resistance of each strain gage due to flexure of the plates. The change in position will be represented by the voltage drop measurement which has been calibrated into displacement in one ten-thousandth of an inch ($1 \times 10^{-4}$ in.). Therefore, the measuring device will indicate the distance of the movement of the probes in the crack or hole.

The strain gage elements are shown in the Wheatstone bridge circuit and designated as $T_1$, $C_1$, $T_2$ and $C_2$. These designations indicate whether the strain gage is under tension (T) or compression (C) for each of the two legs.

A device made with the given dimensions will measure a displacement of from 0.0001 to 0.125 inch. The range of measurement may be extended by increasing the length and spacing of the sensing arms.

In operation, the gage is constructed, treated, assembled, and calibrated by use of a micrometer and the gages are secured into an electrical Wheatstone bridge circuit. A hole having a diameter slightly larger than the combined thickness of the probe ends 21 is drilled into the slot or crack in a test specimen or structural element where displacement is desired to be measured. The legs of the gage are compressed or forced together at the probe end and the probe ends are inserted into the hole. The probe ends are permitted to move outwardly against the surface forming the hole. With the electrical circuit electrically operational, the measuring instrument is set at a zero reading by adjusting the arm 25. External loading on the test specimen or structural element will cause separation of the test element along the crack or hole. Any separation of the element will allow the probe ends to move away from each other thereby bending the gage legs at the strain gage elements. Bending of the strain gage elements changes the resistance of the strain gage elements to change the current flow. A measure of the voltage drop across the legs of the Wheatstone bridge is calibrated into displacement distance of the probes and thereby provides a measure of the displacement of the test element.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. An improved device for measuring a small displacement between opposite surfaces; which comprises:
   a pair of resilient arms secured together at one end and separated by a spacer,
   each of said arms having upper and lower end portions bent in opposite directions at an angle with respect to a central portion,
   a pair of strain gages secured on opposing faces directly opposite each other on each of said pair of arms and centered on the bend in the upper end of said arms near the end portions which are secured together,
   a probe secured to each of the arms at the unsecured ends of the arms,
   said probes including a small end portion for minimum contact of the surfaces whose displacement are to be measured,
   whereby said probes are substantially in parallel when said arms are forced together under tension and said strain gages are flexed by bending movement of said arms at the upper bend in said arms.

2. A device as claimed in claim 1; wherein:
   said smaller end portion of each of said probes have rounded surfaces which engage the opposite surfaces whose displacement are to be measured.

3. A device as claimed in claim 2; wherein:
   said small end portions of said probes have a combined diameter of about one-eighth inch.

* * * * *